United States Patent
Aronov et al.

(10) Patent No.: US 9,373,837 B2
(45) Date of Patent: *Jun. 21, 2016

(54) METHODS OF MANUFACTURING MULTI-FUNCTIONAL ELECTRODE DEVICES FOR FAST-CHARGING OF ENERGY-STORAGE DEVICES

(71) Applicant: StoreDot Ltd., Herzeliya (IL)

(72) Inventors: Daniel Aronov, Netanya (IL); Liron Amir, Ramat Gan (IL); Doron Burshtain, Herzeliya (IL); Olga Guchok, Ramat Gan (IL); Leonid Krasovitsky, Rishon LeTzion (IL)

(73) Assignee: StoreDot Ltd., Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,340

(22) Filed: Dec. 28, 2015

(65) Prior Publication Data
US 2016/0133919 A1 May 12, 2016

Related U.S. Application Data

(63) Continuation of application No. 14/707,004, filed on May 8, 2015, now Pat. No. 9,225,187.

(60) Provisional application No. 61/992,929, filed on May 14, 2014.

(51) Int. Cl.
*H02J 7/00* (2006.01)
*H01M 4/139* (2010.01)
(Continued)

(52) U.S. Cl.
CPC ............... *H01M 4/139* (2013.01); *H01M 4/04* (2013.01); *H01M 10/0436* (2013.01); *H01M 10/0525* (2013.01); *H02J 7/007* (2013.01); *H02J 7/0052* (2013.01); *H01M 2220/30* (2013.01)

(58) Field of Classification Search
CPC . H01M 10/0525; H01M 10/44; H02J 7/0075; H02J 7/0052
See application file for complete search history.

(56) References Cited

U.S. PATENT DOCUMENTS 5,744,258 A 4/1998 Bai et al.
2005/0153173 A1 7/2005 Kumashiro et al.
(Continued)

FOREIGN PATENT DOCUMENTS

WO WO 2015/032950 3/2015

OTHER PUBLICATIONS

Lei Y et al. "Bi-material anode based on porous graphitic carbon for Li4Ti5o12-PGC/LiFePO4 hybrid battery capacitor" (2013) Electrochimica Acta, vol. 107, pp. 413-418, ISSN 0013-4686, Jun. 7, 2013.

(Continued)

*Primary Examiner* — Stewart Fraser
(74) *Attorney, Agent, or Firm* — Pearl Cohen Zedek Latzer Baratz LLP

(57) ABSTRACT

Methods for manufacturing multi-functional electrode (MFE) devices for fast-charging of energy-storage devices are provided. The method includes assembling first MFE structure for forming a suitable electrochemical half-couple, the first MFE structure having a first fast-charging component (FCC) and a first MFE assembly and a counter-electrode structure for forming a complementary electrochemical half-couple and supplying an internal voltage controller (IVC) for applying a bias potential to the first MFE structure and/or the counter-electrode structure, the bias potential is set in accordance with the first MFE structure and said counter-electrode structure. The IVC is configured to regulate an intra-electrode potential gradient between the first FCC and the first MFE assembly to control a charge rate from the first FCC to the first MFE assembly.

17 Claims, 6 Drawing Sheets

(51) Int. Cl.
*H01M 10/0525* (2010.01)
*H01M 10/04* (2006.01)
*H01M 4/04* (2006.01)

(56) References Cited

U.S. PATENT DOCUMENTS

2013/0119921 A1* 5/2013 Choe ................... H02J 7/007
                                                         320/106
2014/0127565 A1   5/2014 Furukawa et al.

OTHER PUBLICATIONS

International Search Report for International App. No. PCT/IL2015/050481 dated Aug. 26, 2015.
A. Vlad et al. "Hybrid supercapacitor-battery materials for fast electrochemical charge storage" Scientific reports, 4. Art. No. 4315; DOI:10.1038/srep04315 (2014).
A. Vlad et al. "Hybrid supercapacitor-battery materials for fast electrochemical charge storage" www.nature.com/srep/2014/140307/extref/sre.

* cited by examiner

METHODS OF MANUFACTURING MULTI-FUNCTIONAL ELECTRODE DEVICES FOR FAST-CHARGING OF ENERGY-STORAGE DEVICES

CROSS REFERENCE TO RELATED APPLICATIONS

This patent application is a continuation application of U.S. patent application Ser. No. 14/707,004, filed May 8, 2015, to be issued as U.S. Pat. No. 9,225,187, which claims the benefit of U.S. Provisional Patent Application No. 61/992,929, filed May 14, 2014, both of which are hereby incorporated by reference in their entirety.

FIELD AND BACKGROUND OF THE INVENTION

The present invention relates to multi-functional electrode devices for fast-charging of energy-storage devices and methods therein.

Modern electronic appliances are becoming ubiquitous for personal, as well as business use. It cannot be overstated that with the evolution of such devices, mobility has emerged as a key driver in feature enhancement for technological innovation. While the rapid advancement of low power-consumption processors and flash-memory devices have enabled such mobility to reach new levels of real-world productivity, further development is significantly hampered by the rather slow progress made in battery technology. The proliferation of smart phones, tablets, laptops, ultrabooks and the like (acquiring smaller and smaller form factors) has made this issue even more abundantly apparent as consumers are eager to have longer and longer device usage periods between recharge cycles, without adding heft to the weight and footprint of such devices.

Furthermore, electrical and electronic components that don't fall under the mobile rubric are also in need of extended usage solutions. Such components include devices having sporadic power-source connection (e.g., backup emergency sentinels, remotely-stationed telecommunication repeaters, electric vehicle console communicators, as well as off-shore communication, control, and positioning devices).

The demands of such applications vary widely, for example, in voltage or power level, butallare preferably served by lightweight, power-storage devices which can rapidly and consistently provide high energy density over long time spans, and can be quickly recharged to operational energy levels. To date, such extensive mobile energy needs are being met in part by one of two available types of power-storage devices: rechargeable batteries (e.g., lithium-ion intercalation systems) or supercapacitors (e.g., Faradic pseudo-capacitive type, non-Faradic double-layer reaction types, or hybrid types).

To meet the growing demand in portable electronic devices and devices having sporadic power-source connection, energy storage devices with high specific energy, high power density, long cycle life, low cost, and a high margin of safety must be employed.

Currently, the dominant energy storage device remains the battery, particularly the lithium-ion battery (LIB). LIBs power nearly every portable electronic device, as well as almost every electric car, including the Tesla Model S and the Chevy Volt. Batteries store energy electrochemically, in which chemical reactions release electrical carriers that can be extracted into an electrical circuit. During discharge, the energy-containing lithium ions (Li ions) travel from a high-energy anode material through an electrolyte and a separator to a low-energy cathode material. The electrochemical reaction, taking place in the discharging process, involves internal movement of Li ions from the anode to the cathode, and the release of electrons (e.g., energy) at the anode, which are extracted to the external circuit in order to operate whatever device needed.

During battery charging, energy is used to transfer the Li ions back to the high-energy anode assembly. The charge and discharge processes in batteries are slow processes, and can degrade the chemical compounds inside the battery over time. A key bottleneck in achieving enhanced performance is the limited fast-charging ability of any standard battery. Rapid charging causes accelerated degradation of the battery constituents, as well as a potential fire hazard due to a localized, over-potential build-up and increased heat generation— which can ignite the internal components, and lead to explosion.

For example, LIBs have the highest energy density of rechargeable batteries available, but typically suffer from low power by virtue of reversible Coulombic reactions occurring at both electrodes, involving charge transfer and ion diffusion in bulk electrode materials. Since both diffusion and charge transfer are slow processes, power delivery as well as the recharge time of Li ion batteries is kinetically limited. As a result, batteries have a low power density, and lose their ability to retain energy throughout their lifetime due to material degradation.

On the other extreme, electrochemical double-layer capacitors (EDLCs) or ultracapacitors are, together with pseudocapacitors, part of a new type of electrochemical capacitors called supercapacitors (hereinafter referred to as SCs), which store energy through accumulation of ions on an electrode surface, have limited energy storage capacity, but very high power density. In such SCs, energy is stored electrostatically on the surface of the material, and does not involve a chemical reaction. As a result, SCs can be charged quickly, leading to a very high power density, and do not lose their storage capabilities over time. SCs can last for millions of charge/discharge cycles without losing energy storage capability. The main shortcoming of SCs is their low energy density, meaning that the amount of energy SCs can store per unit weight is very small, particularly when compared to batteries.

The most intuitive approach to combine high energy and high power density within a single device is to combine different types of energy storage sources. So far, such hybrid power-source devices involving SCs and batteries have mainly been explored in view of parallel connection (i.e., an SC is being used as a power supply, while the battery is used as an energy source, which supplies energy both to the load and to the SC, which in turn, should be charged at all times). The contribution of components to the total stored charge is not optimal, due to the minimal use of the SC, and the higher degradation of the battery due to the additional charging of the SC.

In the prior art, Vlad et al. published an article entitled, "Hybrid supercapacitor-battery materials for fast electrochemical charge storage," (Scientific Reports, 4, Article No. 4315, 2014) which presents an approach to design high energy and high power battery electrodes by hybridizing a nitroxide-polymer redox supercapacitor (PTMA) with a LIB material (LiFePO$_4$). The same authors published online supplementary material to the *Scientific Reports* article (www.nature.com/srep/2014/140307/srep04315/extref/srep04315-s1.pdf). Furthermore, an international application was filed with some of said authors as the inventors for "Hybrid electrode for non-aqueous electrolyte secondary battery" (PCT Patent Publication No. WO 2015/032950 A1).

It would be desirable to have multi-functional electrode devices for fast-charging of energy-storage devices and methods therein. Such devices and methods would, inter alia, overcome the various limitations mentioned above.

SUMMARY

It is the purpose of the present invention to provide multi-functional electrode devices for fast-charging of energy-storage devices and methods therein.

It is noted that the term "exemplary" is used herein to refer to examples of embodiments and/or implementations, and is not meant to necessarily convey a more-desirable use-case. Similarly, the terms "preferred" and "preferably" are used herein to refer to an example out of an assortment of contemplated embodiments and/or implementations, and is not meant to necessarily convey a more-desirable use-case. Therefore, it is understood from the above that "exemplary" and "preferred" may be applied herein to multiple embodiments and/or implementations.

Preferred embodiments of the present invention enable voltage-controlled fast-charging of energy storage device, having an anode, a cathode, and an interspersed electrolyte, utilizing a multi-functional electrode (MFE) to provide fast-charging and slow-charging components on one or both electrodes—anode and/or cathode. An Internal Voltage Controller (IVC) provides additional functionality

- Enabling device charging by adjusting the input voltage, delivered by an external charger, to match MFE specifications
- Charge-rate control via current flow inside the MFE The IVC enables the use of various materials (having a range of redox potentials) for both the slow- and fast-charging components by adjusting an intra-electrode potential gradient (i.e., fast-charging versus slow-charging component within a single electrode) and inter-electrode potential gradient (i.e., cathode versus anode). Such a potential gradient is in turn derived from the specific anode and cathode materials used. In such embodiments, a charging control mechanism allows for different charging rates via the IVC (e.g., from ultra-fast to slow charging rates) with typical battery discharging performance.

Therefore, according to the present invention, there is provided a multi-functional electrode (MFE) device for fast-charging of energy-storage devices, the device including: (a) a first MFE structure for forming a suitable electrochemical half-couple, the first MFE structure having a first fast-charging component (FCC) and a first MFE assembly; (b) a counter-electrode structure for forming a complementary electrochemical half-couple to the first MFE structure; and (c) an internal voltage controller (IVC) for applying a bias potential to the first MFE structure and/or the counter-electrode structure, whereby the bias potential is set in accordance with the chemical nature of the first MFE structure and the counter-electrode structure.

Preferably, the first MFE structure is selected from the group consisting of: a cathode structure, an anode structure, a cathode assembly, and an anode assembly.

Preferably, the first FCC is selected from the group consisting of: a cathode FCC and an anode FCC.

Preferably, the IVC is integrally assembled with the first MFE structure, the first FCC, and the counter-electrode structure.

Preferably, the IVC is configured to regulate an inter-electrode potential gradient between the first MFE structure and the counter-electrode structure.

Preferably, the IVC is configured to regulate an intra-electrode potential gradient between the first FCC and the first MFE assembly, thereby controlling a charge rate from the first FCC to the first MFE assembly.

Most preferably, the intra-electrode potential gradient is adapted to regulate movement of ions between the first FCC and the first MFE assembly.

Most preferably, the intra-electrode potential gradient is adapted to regulate an ion transport rate.

Preferably, the IVC is configured to enable the fast-charging of energy-storage devices.

Most preferably, the IVC is configured to allow redox processes occurring at the first FCC and the first MFE assembly to proceed in a charging mode selected from the group consisting of: a parallel charging mode having a slow-charge rate, and a sequential charging mode having a fast-charge rate.

Preferably, the IVC is configured to enable extended cycle life of the energy-storage devices, and wherein the IVC is configured to enable reduced electrode degradation by controlling a charge rate.

Preferably, the counter-electrode structure is selected from the group consisting of: a second MFE structure, a cathode structure, and an anode structure, and wherein the second MFE structure has a second FCC and a second MFE assembly.

Most preferably, the second FCC is selected from the group consisting of: a cathode FCC and an anode FCC.

Most preferably, the second MFE structure is selected from the group consisting of: a cathode structure, an anode structure, a cathode assembly, and an anode assembly.

Most preferably, the IVC is configured to regulate an intra-electrode potential gradient between the second FCC and the second MFE assembly, thereby controlling a charge rate from the first FCC to the first MFE assembly.

According to the present invention, there is provided a method for fast-charging of energy-storage devices using multi-functional electrodes, the method including the steps of: (a) configuring a first MFE structure for forming a suitable electrochemical half-couple, wherein the first MFE structure having a first fast-charging component (FCC) and a first MFE assembly; (b) providing a counter-electrode structure for forming a complementary electrochemical half-couple to the first MFE structure; and (c) supplying an internal voltage controller (IVC) for applying a bias potential to the first MFE structure and/or the counter-electrode structure, whereby the bias potential is set in accordance with the chemical nature of the first MFE structure and the counter-electrode structure.

Preferably, the first MFE structure is selected from the group consisting of: a cathode structure, an anode structure, a cathode assembly, and an anode assembly.

Preferably, the first FCC is selected from the group consisting of: a cathode FCC and an anode FCC.

Preferably, the IVC is integrally assembled with the first MFE structure, the first FCC, and the counter-electrode structure.

Preferably, the IVC is configured to regulate an inter-electrode potential gradient between the first MFE structure and the counter-electrode structure.

Preferably, the IVC is configured to regulate an intra-electrode potential gradient between the first FCC and the first MFE assembly, thereby controlling a charge rate from the first FCC to the first MFE assembly.

Most preferably, the intra-electrode potential gradient is adapted to regulate movement of ions between the first FCC and the first MFE assembly.

Most preferably, the intra-electrode potential gradient is adapted to regulate an ion transport rate.

Preferably, the IVC is configured to enable the fast-charging of energy-storage devices.

Most preferably, the IVC is configured to allow redox processes occurring at the first FCC and the first MFE assembly to proceed in a charging mode selected from the group consisting of: a parallel charging mode having a slow-charge rate, and a sequential charging mode having a fast-charge rate.

Preferably, the IVC is configured to enable extended cycle life of the energy-storage devices, and wherein the IVC is configured to enable reduced electrode degradation by controlling a charge rate.

Preferably, the counter-electrode structure is selected from the group consisting of: a second MFE structure, a cathode structure, and an anode structure, and wherein the second MFE structure has a second FCC and a second MFE assembly.

Most preferably, the second FCC is selected from the group consisting of: a cathode FCC and an anode FCC.

Most preferably, the second MFE structure is selected from the group consisting of: a cathode structure, an anode structure, a cathode assembly, and an anode assembly.

Most preferably, the IVC is configured to regulate an intra-electrode potential gradient between the second FCC and the second MFE assembly, thereby controlling a charge rate from the first FCC to the first MFE assembly.

These and further embodiments will be apparent from the detailed description that follows.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to multi-functional electrode devices for fast-charging of energy-storage devices and methods therein. The principles and operation for providing such devices and methods, according to the present invention, may be better understood with reference to the accompanying description and the drawings.

Figure 1:
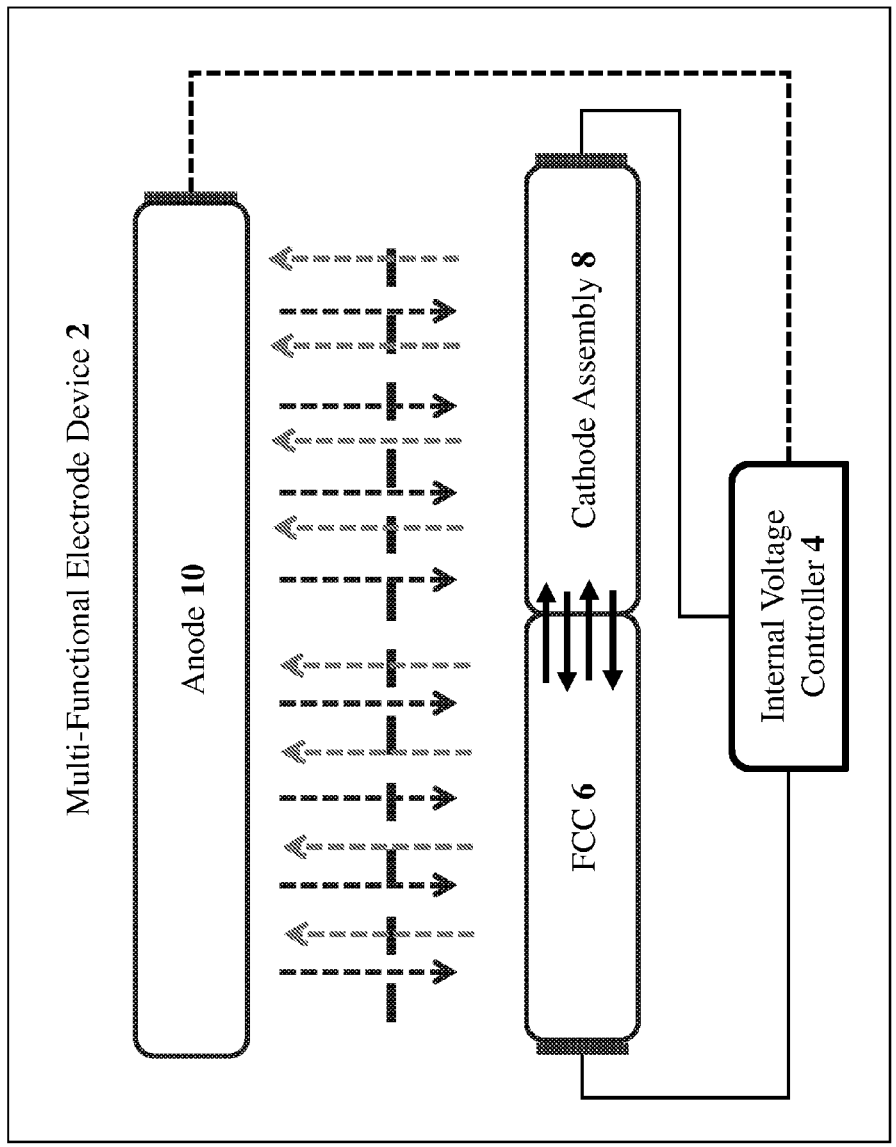
FIG. 1 is a simplified high-level schematic diagram of a multi-functional electrode device with the MFE acting as a cathode structure for voltage-controlled fast-charging of energy-storage devices, according to preferred embodiments of the present invention.

Referring to the drawings, FIG. 1 is a simplified high-level schematic diagram of a multi-functional electrode device with the MFE acting as a cathode structure for voltage-controlled fast-charging of energy-storage devices, according to preferred embodiments of the present invention. A Multi-Functional Electrode (MFE) device 2 is shown having an Internal Voltage Controller (IVC) 4, a Fast-Charging Component (FCC) 6, a cathode assembly 8, and an anode 10. FCC 6 and cathode assembly 8 act as a multi-functional cathode structure. IVC 4 expresses a dual-function voltage control: "local"—control within the cathode (FCC 6 versus cathode assembly 8), and "global"—cathode versus anode control.

FCC 6 can be composed of polymers, gel, nanocomposites, metal oxides, and/or organic compounds that can undergo rapid single or multiple reversible, redox reactions involving, inter alia, Li ion and its counterion, which can be common to an organic-solvent electrolyte, an ionic liquid, an ionic polymer, and/or a solid-state electrolyte (e.g., hexafluorophosphate ($PF_6^-$) anion, bistriflimide ($TFSI^-$) anion), or a combination thereof.

FCC 6 is acting as a sub-component of the cathode in MFE device 2. During charging, FCC 6 is typically charged first, due to a faster redox rate of FCC 6 in comparison to cathode assembly 8. When the charging current is applied, electrolyte anions move toward FCC 6, and participate in the FCC/anion redox reaction which takes place within the bulk, surfaces, and/or interfaces of FCC 6. The redox processes of FCC 6 and cathode assembly 8 proceeds either in parallel (at the slow-charge rate) or sequentially (at the fast-charge rate).

The following description uses an LIB as an exemplary embodiment of to the present invention. Upon charging, an input voltage, provided from an external charger, is adjusted by IVC 4 to match the appropriate voltage for charging of FCC 6. With the application of high charging current, FCC 6 is charged first, thereby allowing the operation of the external charger to be terminated. An internal potential gradient is created due to different $FCC/FCC^+$ electrochemical potentials and electrochemical potentials of LiX/X (representing the lithium cathode assembly) versus $Li/Li^+$.

Due to such an internal potential gradient and the applied potential gradients (via IVC 4), electrons flow from lithium cathode assembly 8 to FCC 6 (represented by the solid, horizontal arrows in FIG. 1), while the Li ions are extracted from lithium cathode assembly 8. The electrochemical reactions taking place are represented generically in Oxidation Half-Reaction 1 and Reduction Half-Reaction 2 below for a lithium cathode assembly (LiX) and the sub-components of the FCC.

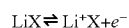 (Oxidation Half-Reaction 1)

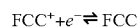 (Reduction Half-Reaction 2)

The extracted Li ions move in response to an electric field generated by the charged FCC 6 and/or with or without an additional applied potential between the anode and the cathode using IVC 4. IVC 4 can also be used to modify the potential gradient between the two cathode components—FCC 6 and lithium cathode assembly 8. Such modification can be done at any stage of the charge/discharge process and as a stand-alone operation. The potential gradient is directly related to the current flow between the cathode components of MFE device 2. Such current is proportional to the rate of lithium-ion extraction from lithium cathode assembly 8 during charging of MFE device 2. Such a configuration provides ultra-fast charging in comparison to a standard LIB, and control of the charging current (and hence, the charging rate) of the LIB components—the Li ion intercalation anode and the Li cathode assembly.

In commonly-used LIBs, higher charging currents reduce the cycle life of the battery. Embodiments of the present invention can provide a greatly-enhanced cycle life by regulating the charging of lithium cathode assembly 8 using IVC 4 to a slow-charge profile without increasing the charge time of MFE device 2. The cycle life of the battery is further enhanced by the greater lithium capacity of the anode and/or cathode.

MFE device 2 can also control or eliminate the charge gradient that is built up due to the spatial separation between the cation and anion at the interface of FCC 6 and lithium cathode assembly 8 (e.g., $Li^+$ and $PF_6^-$ or $TFSI^-$). The spatial separation is enabled by the joint anion mechanisms which exist both in the electrolyte and in the cathode and/or anode. Such mechanisms also reduce the dependency of the Li ion transport on its counterion, and hence, increases the transfer rate of the Li ions within the electrolyte.

The difference in electrochemical potentials of the FCC/ $FCC^+$ couple of FCC 6 and lithium cathode assembly 8 (e.g., Li-metal oxide/metal oxide assembly) versus $Li/Li^+$ may be positive, negative, or zero. The determining factor is the applied potential gradient created by the bias potential of IVC 4, which can alter the current in either direction (i.e., toward or from lithium cathode assembly 8).

A reverse electron flow from FCC 6 to lithium cathode assembly 8 is also possible by controlling the potential gradient via IVC 4. The internal ratio of $FCC^+$ versus FCC can be increased, and thus, the Li ion extraction rate from lithium cathode assembly 8 can be regulated.

Figure 2:
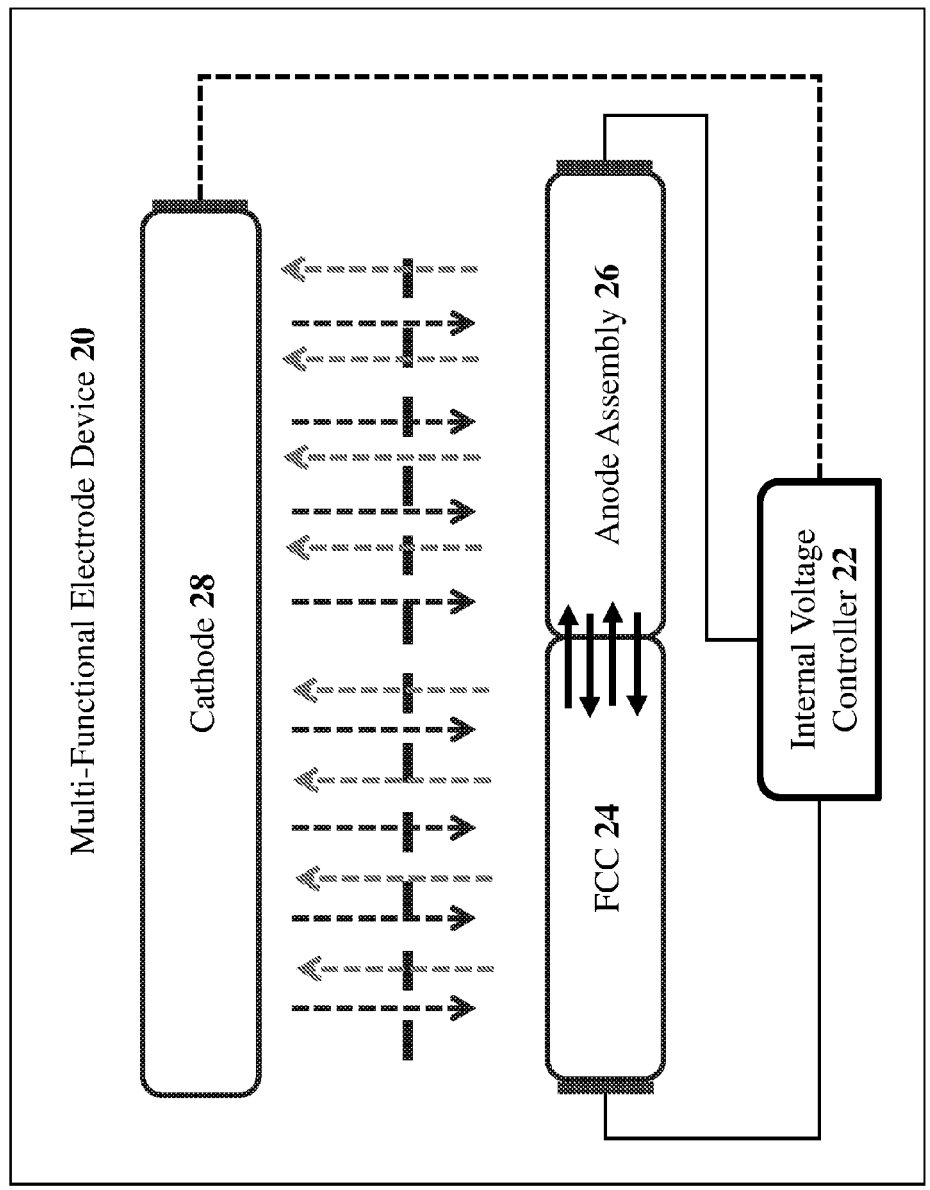
FIG. 2 is a simplified high-level schematic diagram of a multi-functional electrode device with the MFE acting as an anode structure for voltage-controlled fast-charging of energy-storage devices, according to preferred embodiments of the present invention.

FIG. 2 is a simplified high-level schematic diagram of a multi-functional electrode device with the MFE acting as an anode structure for voltage-controlled fast-charging of energy-storage devices, according to preferred embodiments of the present invention. An MFE device 20 is shown having an IVC 22, an FCC 24, an anode assembly 26, and a cathode 28. FCC 24 and anode assembly 26 act as a multi-functional anode structure. IVC 22 expresses a dual-function voltage control: "local"—control within the anode (FCC 24 versus anode assembly 26) and "global"—cathode versus anode control.

FCC 24 is acting as a sub-component of the anode in MFE device 20. Upon applying a bias potential via an external charger, the delivered input voltage is adjusted by IVC 22 to match the appropriate voltage for charging of FCC 24, allowing FCC 24 to be the first component to be charged. FCC 24 reacts with Li ions as represented in Reduction Half-Reaction 3 below.

$FCC + e^- + Li^+ \rightleftharpoons LiFCC$ (Reduction Half-Reaction 3)

Li ions are drawn toward the anode (i.e., FCC 26) due to the external bias potential applied by the external charger; therefore, FCC 26 is reduced during reaction with the Li ions. Due to the fast $FCC/Li^+$ ion-transfer mechanism, after the consumption of the bulk and/or surface FCC active sites, the operation of the external charger can be terminated.

IVC 22 is also used to create a potential gradient that allows the Li ions to migrate toward anode assembly 26 from FCC 24 (see Reduction Half-Reaction 4 below). Such a process can be significantly slower than the initial charging process of FCC 24, and is similar to the process described above with regard to FIG. 1 for FCC 6 acting as a cathode structure. For FCC 24 of FIG. 2, the Li ions are the charge carriers.

Reduction Half-Reaction 4 represents the migration of the Li ions from FCC 24 to anode assembly 26 (denoted as "A" in Reduction Half-Reaction 4). Parameters x and y are the stoichiometric ratio between the Li ions and the ions in anode assembly 26.

$A_y + Li^+_x + xe^- \rightleftharpoons Li_xA_y$ (Reduction Half-Reaction 4)

Figure 3:
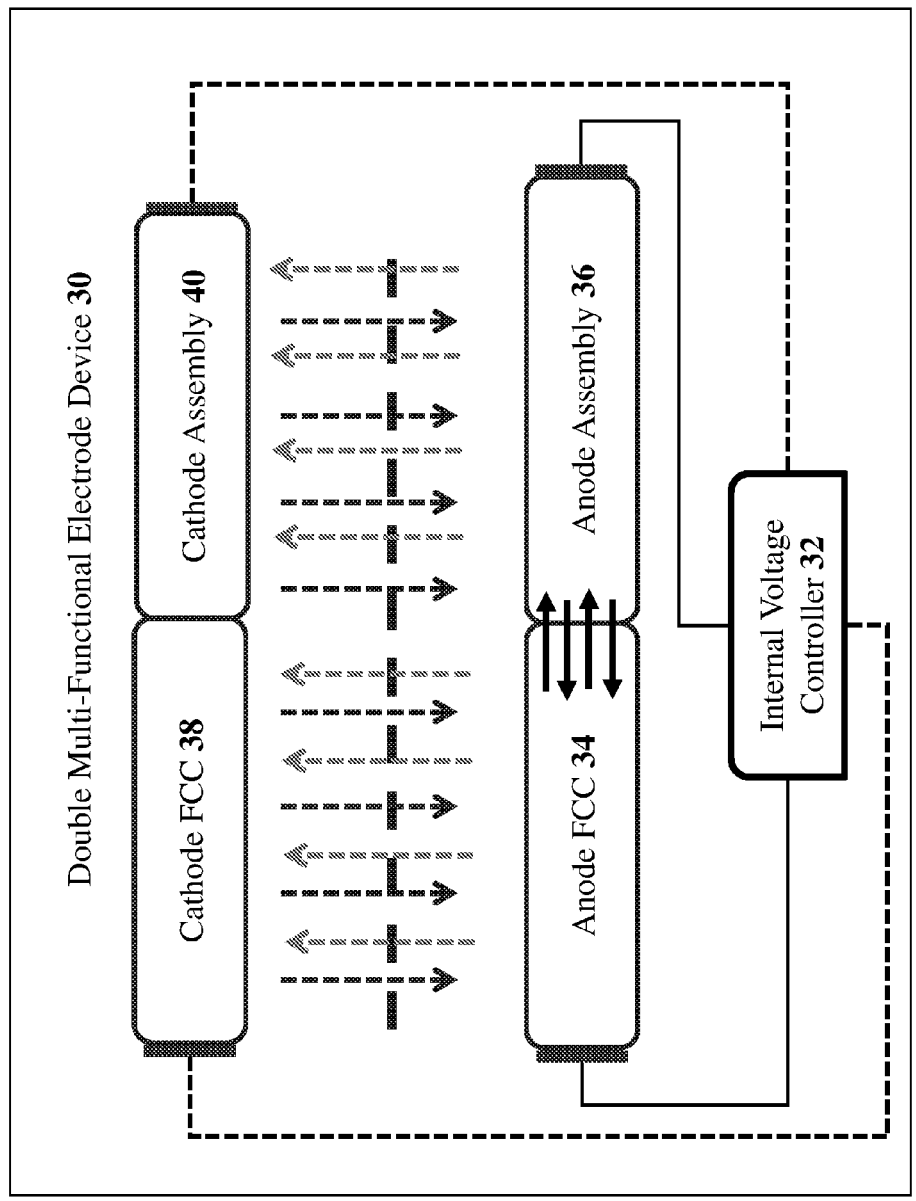
FIG. 3 is a simplified high-level schematic diagram of a double multi-functional electrode device with the MFE acting as both anode and cathode structures for voltage-controlled fast-charging of energy-storage devices, according to preferred embodiments of the present invention.

FIG. 3 is a simplified high-level schematic diagram of a double multi-functional electrode device with the MFE acting as both anode and cathode structures for voltage-controlled fast-charging of energy-storage devices, according to preferred embodiments of the present invention. A double MFE device 30 is shown having an IVC 32, an anode FCC 34, an anode assembly 36, a cathode FCC 38, and a cathode assembly 40.

In such embodiments, both anode and cathode sides have an FCC structure for voltage-controlled fast-charging of energy-storage devices, and each side operates as described above with regard to FIGS. 1 and 2. In addition to the voltage adjustment described with regard to FIGS. 1 and 2, the configuration of FIG. 3 enables IVC 32 to control the potential gradient between each of the configuration components (i.e., anode FCC 34, anode assembly 36, cathode FCC 38, and cathode assembly 40). As a non-limiting example, the potential bias between anode FCC 34 and cathode FCC 38 versus anode assembly 36 can be modified.

Figure 4:
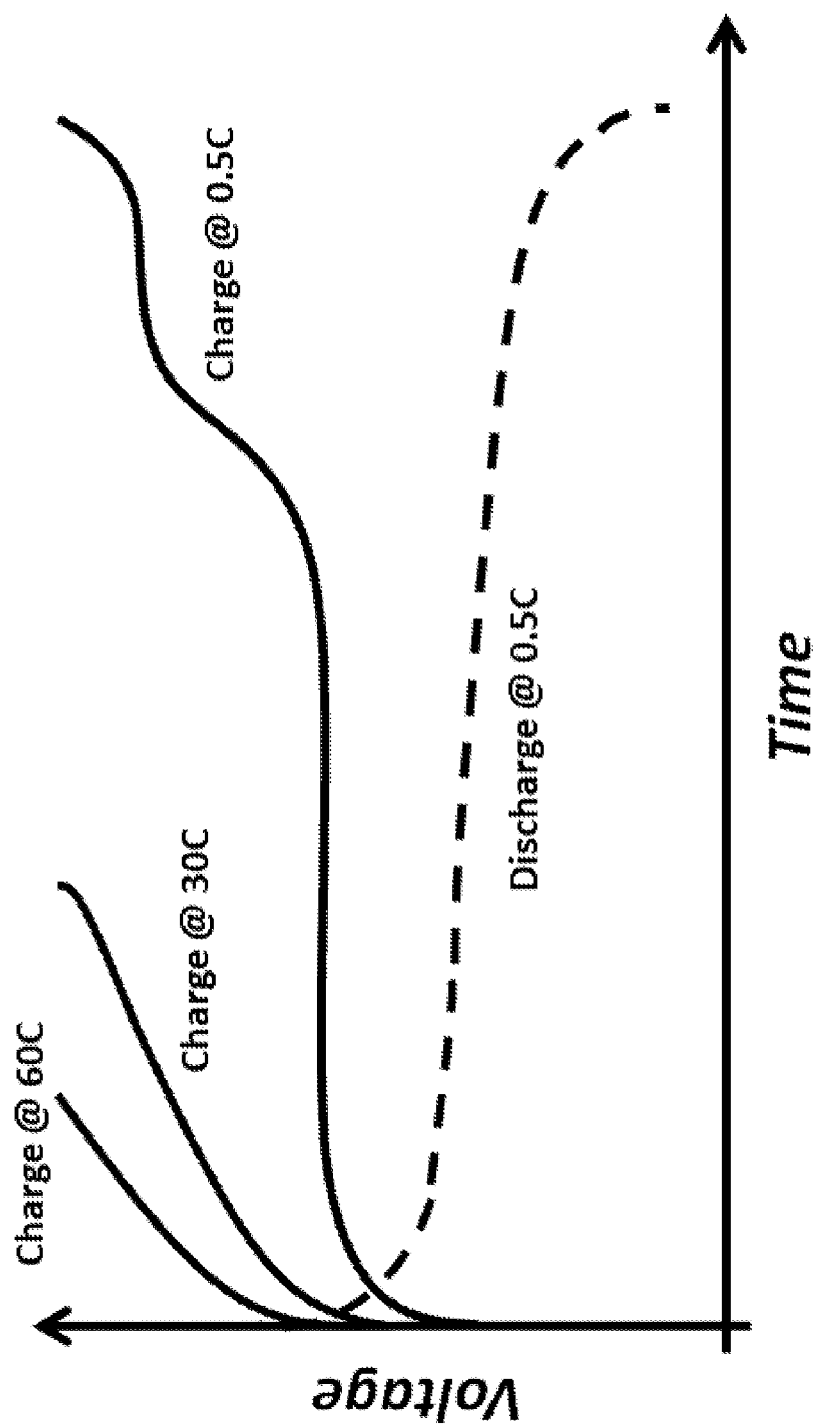
FIG. 4 is a graph of charge and discharge profiles of a multi-functional electrode device for voltage-controlled fast-charging of energy-storage devices, according to preferred embodiments of the present invention.

FIG. 4 is a graph of charge and discharge profiles of a multi-functional electrode device for voltage-controlled fast-charging of energy-storage devices, according to preferred embodiments of the present invention. The charge/discharge curves of the MFE devices of FIGS. 1 and 2 are simulated with different charging rates.

Battery charging rates (C-rates) are commonly represented in units of "C" which is equal to the full capacity of a battery in one hour. As examples, a C-rate of C/2 would need 2 hours to fully charge the battery from an empty state, and a C-rate of 2 C would need 30 minutes.

At high charging rates (e.g., 60 C), the only component of the MFE device being charged is the FCC, while at low discharging rates (e.g., 0.5 C), most of the energy is extracted from the anode assembly, exhibiting a typical LIB discharge-profile. In contrast, at low charging rates (e.g., 0.5 C), both components are being charged sequentially, as noted by the "double S"-shaped potential curve in FIG. 4.

Figure 5:
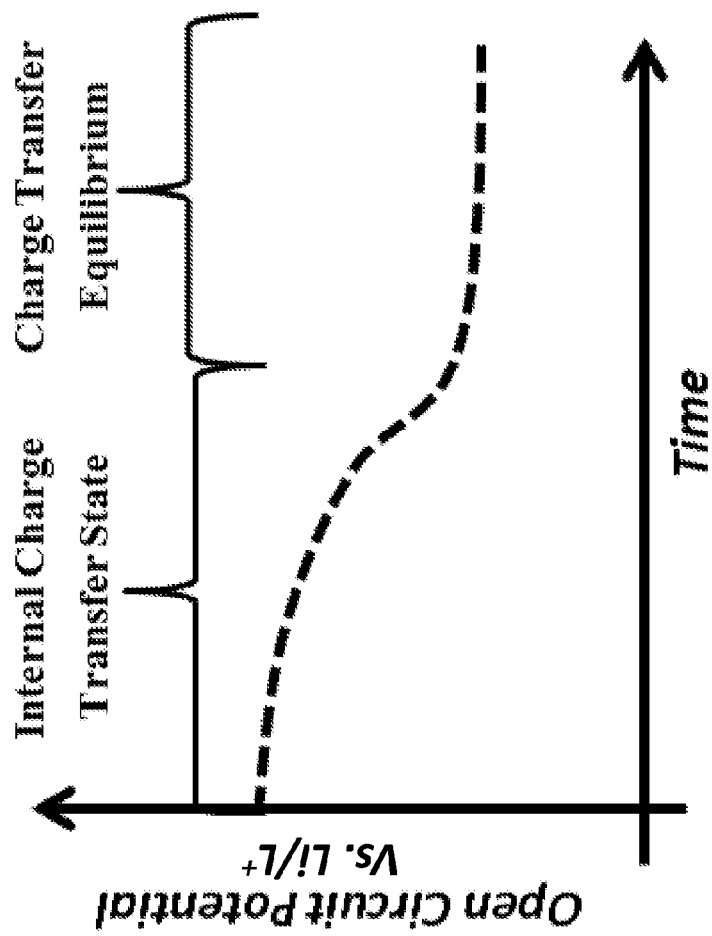
FIG. 5 is a graph depicting the relaxation mechanism operative within a multi-functional electrode device, according to preferred embodiments of the present invention.

FIG. 5 is a graph depicting the relaxation mechanism operative within a multi-functional electrode device, according to preferred embodiments of the present invention. FIG. 5 is an indicative graph for an MFE cathode structure versus $Li/Li^+$ as described with regard to FIG. 1. The lithium cathode assembly continues to be oxidized, charging the anode, according to the internal charge-transfer mechanism discussed above, even after external charging is terminated. During such charge-transfer equilibration, the open-circuit potential of the MFE device changes from a higher, non-equilibrium state to a lower, equilibrium state.

Figure 6:
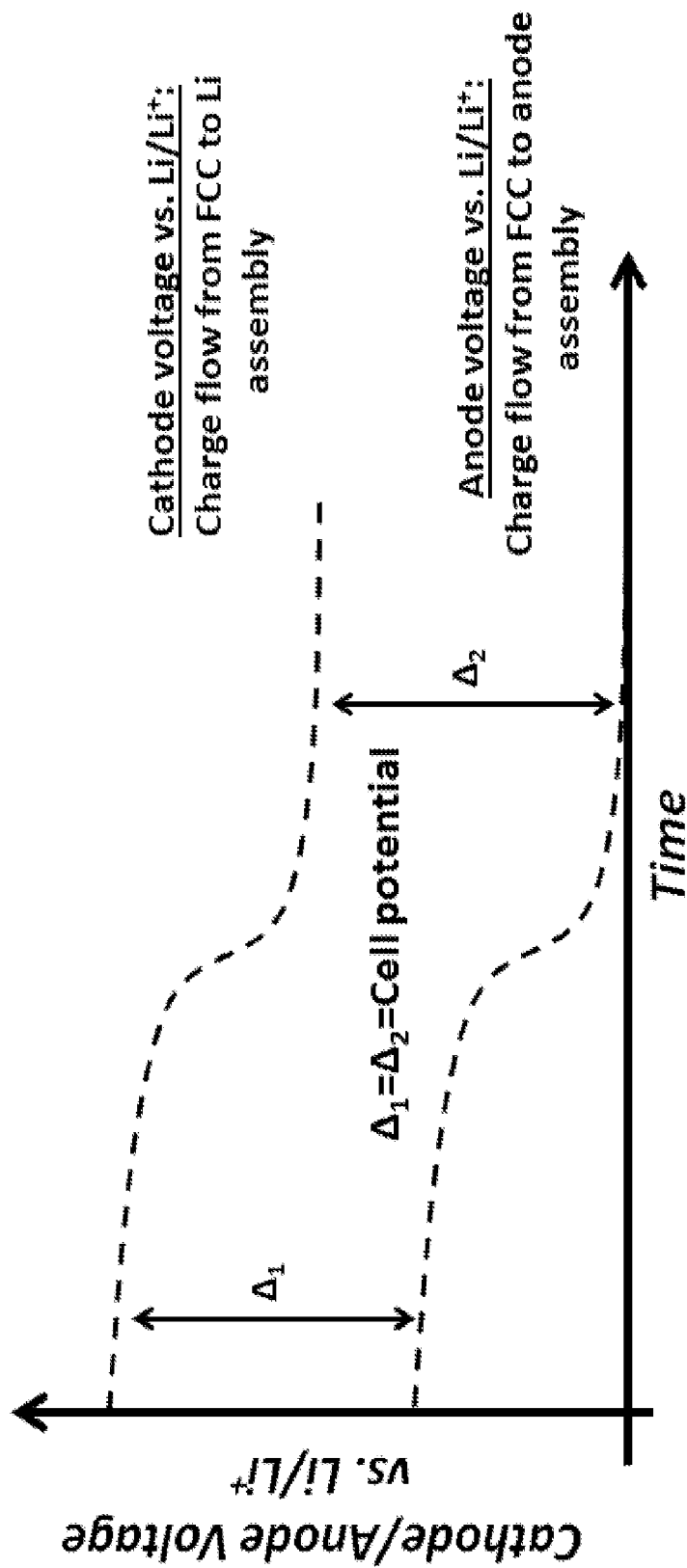
FIG. 6 is a graph depicting the relaxation mechanism operative within a double multi-functional electrode device, emphasizing the cell-potential transition states, according to preferred embodiments of the present invention.

FIG. 6 is a graph depicting the relaxation mechanism operative within a double multi-functional electrode device, emphasizing the cell-potential transition states, according to preferred embodiments of the present invention. FIG. 6 is an indicative graph showing the transition-state curves for double MFE cathode/anode structures as described with regard to FIG. 3. FIG. 6 shows the versatile control of the potential gradient within the double MFE device. Control over the bias potential between the anode FCC and cathode FCC, versus the anode assembly, enables charge transfer from both FCCs to the anode and cathode assemblies (generically described as MFE assemblies).

The cell potential, $\Delta_1=\Delta_2$, remains constant at each stage, but still enable internal charge flow within the anode MFE and the cathode MFE separately. The IVC controls the potential difference between the components in a way that leaves the overall cell potential constant, or with a gradient (i.e., rate changing) according to the requisite condition.

While the present invention has been described with respect to a limited number of embodiments, it will be appreciated that many variations, modifications, and other applications of the present invention may be made.

What is claimed is:

1. A method for manufacturing multi-functional electrode (MFE) devices for fast-charging of energy-storage devices, the method comprising:
    configuring a first MFE structure for forming a suitable electrochemical half-couple, wherein said first MFE structure has a first fast-charging component (FCC) and a first MFE assembly;
    providing a counter-electrode structure for forming a complementary electrochemical half-couple to said first MFE structure; and
    assembling an internal voltage controller (IVC) with said first MFE structure and said counter-electrode structure for applying a bias potential to said first MFE structure and/or said counter-electrode structure, whereby said bias potential is set in accordance with said first MFE structure and said counter-electrode structure.

2. The method of claim 1, wherein said counter-electrode structure is a second MFE structure and said second MFE structure has a second FCC and a second MFE assembly.

3. The method of claim 2, wherein said first MFE structure is a cathode structure and said second MFE structure is an anode structure.

4. The method of claim 1, wherein said first MFE structure is a cathode structure, said first FCC is a cathode FCC and said first MFE assembly is a cathode assembly.

5. The method of claim 4, wherein said counter-electrode structure is an anode.

6. The method of claim 4, wherein said counter-electrode structure is an anode structure having an anode FCC and an anode assembly.

7. The method of claim 1, wherein said first MFE structure is an anode structure, said first FCC is an anode FCC and said first MFE assembly is an anode assembly.

8. The method of claim 7, wherein said counter-electrode structure is a cathode.

9. The method of claim 1, wherein said IVC is configured to regulate an inter-electrode potential gradient between said first MFE structure and said counter-electrode structure.

10. The method of claim 1, wherein said IVC is configured to regulate an intra-electrode potential gradient between said first FCC and said first MFE assembly, thereby controlling a charge rate from said first FCC to said first MFE assembly.

11. The method of claim 10, wherein said intra-electrode potential gradient is adapted to regulate movement of ions between said first FCC and said first MFE assembly.

12. The method of claim 10, wherein said intra-electrode potential gradient is adapted to regulate an ion transport rate.

13. The method of claim 1, wherein said IVC is configured to enable the fast-charging of energy-storage devices.

14. The method of claim 13, wherein said IVC is configured to allow redox processes occurring at said first FCC and said first MFE assembly to proceed in a charging mode selected from the group consisting of: a parallel charging mode having a slow-charge rate, and a sequential charging mode having a fast-charge rate.

15. The method of claim 1, wherein said IVC is configured to enable extended cycle life of the energy-storage devices, and wherein said IVC is configured to enable reduced electrode degradation by controlling a charge rate.

16. The method of claim 2, wherein said IVC is configured to regulate an intra-electrode potential gradient between said second FCC and said second MFE assembly, thereby controlling a charge rate from said second FCC to said second MFE assembly.

17. The method of claim 16, wherein said intra-electrode potential gradient is adapted to regulate movement of ions between said second FCC and said second MFE assembly.

* * * * *